United States Patent [19]
Sexsmith

[11] Patent Number: 5,178,675
[45] Date of Patent: Jan. 12, 1993

[54] ALKOXY SILANE ADHESIVE COMPOSITIONS

[75] Inventor: Fred H. Sexsmith, Erie, Pa.

[73] Assignee: Lord Corporation, Erie, Pa.

[21] Appl. No.: 673,627

[22] Filed: Mar. 22, 1991

[51] Int. Cl.$^5$ .............................................. C08G 77/26
[52] U.S. Cl. .................... 106/287.11; 106/13; 106/15.05; 106/16; 528/38
[58] Field of Search ............. 106/287.13, 287.11, 106/287.15, 287.16, 13, 15.05, 16; 528/38

[56] References Cited

U.S. PATENT DOCUMENTS

| | | | |
|---|---|---|---|
| 3,022,196 | 2/1962 | Jenkins et al. | 117/127 |
| 3,576,779 | 4/1971 | Holdstock et al. | 528/38 |
| 4,196,014 | 4/1980 | Taniyama et al. | 106/287.13 |
| 4,238,393 | 12/1980 | Takamizawa et al. | 106/287.13 |
| 4,339,565 | 7/1982 | Tomada | 106/287.13 |
| 4,618,389 | 10/1986 | Agodoa | 106/287.13 |
| 4,871,788 | 10/1989 | Plueddemann | 106/287.11 |

FOREIGN PATENT DOCUMENTS

| | | | |
|---|---|---|---|
| 56-125462 | 10/1981 | Japan | 106/287.11 |
| 62-15668 | 1/1987 | Japan . | |
| 62-282148 | 11/1987 | Japan . | |

*Primary Examiner*—Theodore Morris
*Assistant Examiner*—David M. Brunsman
*Attorney, Agent, or Firm*—W. Graham Buie

[57] ABSTRACT

An adhesive composition useful for bonding various substrates which contain an alkoxy silane compound and an unsaturated acid compound. A preferred embodiment of the invention is an aqueous formulation containing a low molecular weight alkoxy silane compound, a low molecular weight unsaturated acid compound, and water. An example of the alkoxy silane compound is aminopropyl triethoxysilane while an example of the unsaturated acid compound is methacrylic acid. The adhesive composition is particularly effective in bonding non-sulfurcured elastomeric materials such as polyol- and peroxide-cured elastomers to metal surfaces.

16 Claims, No Drawings

ALKOXY SILANE ADHESIVE COMPOSITIONS

FIELD OF THE INVENTION

The present invention relates to adhesive compositions that are useful for bonding various substrates. More specifically, the invention relates to the utilization of certain alkoxy silane compounds and certain unsaturated acid compounds to generate adhesive compositions that are particularly useful for bonding non-sulfur-cured elastomeric materials.

BACKGROUND OF THE INVENTION

The evolution and technical development of adhesive compositions to adapt to ever changing substrates, bonding conditions and working environments is an ongoing and challenging process for researchers in the adhesives field. Due to the recently heightened awareness and concern for the environment, a common thread among all research projects involving adhesive formulations is the goal of developing a water-based system that will avoid the use of volatile solvents which may be harmful to the environment. Many of these research projects are targeted towards developing adhesive compositions which are useful for bonding elastomeric materials.

There are many types of elastomeric materials and each elastomeric material may have unique properties that must be dealt with in order to develop an adhesive which will effectively bond that elastomeric material. For example, many natural rubber compositions are cured by utilizing various sulfur compounds. These sulfur-cured elastomeric materials have common properties due to the nature of the sulfur curing process. Various elastomeric materials such as silicone rubbers, nitrile butadiene rubbers, and fluoroelastomers can also be cured by utilizing polyol or peroxide compounds. Polyol-cured elastomers and peroxide-cured elastomers are typically utilized in the production of various seals and gaskets as high performance specialty elastomers which are capable of withstanding extreme conditions such as high temperature and/or organic fluid environments. Adhesive compositions that effectively bond sulfur-cured elastomeric materials do not necessarily exhibit the same level of performance when utilized to bond non-sulfur-cured elastomeric materials such as the high performance specialty elastomers described above. In general, non-sulfur-cured elastomeric materials are relatively difficult to bond and represent a substantial challenge to researchers in the adhesives industry.

One example of an adhesive previously developed for the bonding of peroxide-cured silicone rubbers is described in U.S. Pat. No. 3,022,196. This adhesive composition utilizes a mixture of vinyl triethoxysilane and gamma-aminopropyl triethoxysilane in a proportion of about five parts by weight of the vinyl silane per part by weight of the aminopropyl silane. The vinyl silane is not water-soluble and therefore it is necessary to use alcohols or other organic solvents to prepare the adhesive formulation. Various acidic compounds are recommended to adjust the pH of the formulations (and apparently to catalyze hydrolytic reaction of the silanes' alkoxy groups with water which may be present in a minor amount).

A need accordingly exists for an environmentally safe, aqueous adhesive composition which can effectively bond various materials including non-sulfur-cured elastomeric materials, particularly high-performance specialty elastomeric materials such as polyol- or peroxide-cured elastomers.

SUMMARY OF THE INVENTION

In general, the present invention relates to an adhesive composition which can be applied in any form to various substrates and which comprises certain alkoxy silane compounds and certain unsaturated acid compounds defined hereinafter. More specifically and more preferably, the present invention relates to a water-based, environmentally safe adhesive composition that can be utilized to provide excellent adhesion between non-sulfur-cured elastomeric materials and other surfaces such as metal surfaces. The preferred aqueous embodiment of the present invention comprises low molecular weight alkoxy silane compounds and low molecular weight unsaturated acid compounds in combination with water.

DETAILED DESCRIPTION OF THE INVENTION

The alkoxy silane compounds of the present invention correspond to the general formula:

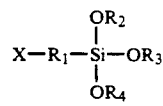

wherein $R_1$ is a divalent aliphatic hydrocarbon residue having from about 1 to 10 carbon atoms; $R_2$, $R_3$, and $R_4$ are the same or different monovalent aliphatic hydrocarbon residues of sufficient molecular weight (having, for example, about 1 to 10 carbon atoms) so that the silane is stable during preparation of the adhesive composition and yet do not prejudice hydrolysis of the silane under conditions of use of the adhesive composition; and X is a group capable of a chemical reaction by condensation (for example, with isocyanate groups). Typically, $R_1$, $R_2$, $R_3$, and $R_4$ each have from about 1 to 5 carbon atoms and X is an amino, alkylamino, hydroxyl, epoxy or mercapto group. Aliphatic hydrocarbon residue herein refers to a linear, branched, or cyclic carbon chain having the appropriate number of carbon atoms that can be substituted with various groups such as hydroxy or alkoxy groups.

For purposes of the preferred aqueous embodiment of the present invention, it is essential that the alkoxy silane compound be of sufficiently low molecular weight so as to be soluble in water. It is therefore desirable, for purposes of the aqueous embodiment, that $R_1$ be a methylene, ethylene, propylene, butylene or pentylene group and that $R_2$, $R_3$ and $R_4$ independently be methyl, ethyl, methylol(—$CH_2OH$), or methoxyethyl (—$CH_2CH_2OCH_3$) groups, while X is preferably an amino or alkylamino group.

Examples of alkoxy silane compounds of the present invention include aminopropyl triethoxysilane, aminopropyl trimethoxysilane, aminoethylaminopropyl triethoxysilane, glycidoxypropyl trimethoxysilane, and mercaptopropyl trimethoxysilane. Examples of low molecular weight silane compounds suitable for use in the aqueous embodiment of the invention include aminopropyl triethoxysilane, aminopropyl trimethoxysilane, and aminoethylaminopropyl triethoxysilane, with aminopropyl triethoxysilane being preferred. The alkoxy silane compound is typically utilized in an amount ranging from about 10 to 90, preferably from about 25 to 75, percent by weight of the non-solvent (or solute) portion of the adhesive composition.

The unsaturated acid compounds of the present invention can essentially be any acidic compound containing a site of unsaturation (e.g., a carbon-carbon double bond) capable of undergoing polymerization with free radicals. Acidic compound herein refers to a compound capable of hydrogen ion (H+) dissociation with attendant water affinity, able to form dissociating salts in water, and able to react so as to form amides, esters and the like under appropriately stringent conditions. Typical unsaturated acidic compounds include methacrylic acid, acrylic acid, maleic acid, fumaric acid, itaconic acid, crotonic acid, vinyl sulphonic acid, and unsaturated derivatives of sulfurous, sulfuric, phosphoric, and phosphonic acids.

In the preferred aqueous embodiment of the present invention, it is essential that the unsaturated acid compound be of sufficiently low molecular weight so as to be soluble in water. Examples of low molecular weight unsaturated acid compounds preferred for use in the aqueous embodiment include methacrylic acid, acrylic acid, maleic acid, fumaric acid, itaconic acid, crotonic acid, and vinyl sulphonic acid, with methacrylic acid presently being preferred. Low molecular weight herein refers to any molecular weight which will render the respective alkoxy silane compound or unsaturated acid compound soluble in water. The unsaturated acid compound of the present invention is typically utilized in an amount ranging from about 90 to 10, preferably from about 75 to 25, percent by weight of the non-solvent (or solute) portion of the adhesive composition.

An additional acid compound may also be utilized as an optional ingredient in the present invention. The optional acid compound is believed to possibly act as a catalyst for free radical generation or for interaction with free radicals. Typical additional acid compounds include acetic acid, hydrochloric acid, formic acid, propionic acid, nitric acid, and the like. The optional acid, if utilized, is typically employed in an amount ranging from about 0.2 to 10, preferably from about 0.5 to 3, parts by weight per 100 parts by weight of the total adhesive composition (including organic solvent or water).

The adhesive compositions of the present invention can optionally contain other well-known additives including plasticizers, fillers, pigments, reinforcing agents and the like, in amounts employed by those skilled in the adhesive arts to obtain the desired color and consistency. Typical additional additives include titanium dioxide, carbon black and zinc oxide.

The present adhesive compositions are typically prepared by combining or mixing the ingredients and any organic solvent or water in a conventional manner. The present adhesive compositions can be hot- or neat-applied (i.e. in the absence of solvent or water) and can also be applied by the utilization of an appropriate organic solvent. Typical organic solvents useful for applying the present adhesive composition include methanol, ethanol, isopropanol, ethyl acetate, and tetrahydrofuran. An organic solvent, if utilized, is typically employed in an amount sufficient to create an adhesive lacquer having a total solids content ranging from about 1 to 25 percent, preferably about 2 to 15 percent.

Although the adhesive composition of the invention can be applied in any conventional manner as described above, it is particularly preferred to apply the present adhesive composition as a water-based formulation. By utilizing low molecular weight alkoxy silane compounds and low molecular weight unsaturated acid compounds, it has been discovered that the two components can be dissolved in water and applied as an aqueous formulation. The preferred embodiment of the present invention therefore comprises a low molecular weight alkoxy silane compound, a low molecular weight unsaturated acid compound, and water. The water is typically utilized in an amount sufficient to create an aqueous formulation having a total solids content ranging from about 1 to 25, preferably about 2 to 15, percent.

The present invention has been discovered to have a particular affinity for polyol- and peroxide-cured elastomeric materials and the formulation is best utilized under vulcanization bonding conditions known in the art where high temperature and pressure are utilized to bond an elastomeric material to a surface such as a metal surface. Although not completely understood at this time, it is believed or theorized that, in the case of the preferred aqueous embodiment, the low molecular weight alkoxy silane compound and the low molecular weight unsaturated acid compound interact in water to form a water-soluble salt, which is then converted after drying to a coupling or bonding agent, probably an amide adduct, under the temperatures experienced during the vulcanization bonding process. In comparison, it is believed that if the alkoxy silane compound and unsaturated acid compound were caused to react prior to adding to the water, the reaction product of the silane compound and the acid compound would be insoluble in water. The preferred embodiment of the present invention therefore allows for the in situ generation of a coupling agent, such as an amide adduct, which can efficiently bond polyol- and peroxide-cured elastomers to metal surfaces. This in situ generation of the coupling agent provides for the aqueous utilization of a coupling agent which would otherwise be insoluble in water.

The adhesive composition of the invention is preferably utilized to bond an elastomeric material to a metal surface. The composition may be applied to the metal surface by spraying, dipping, brushing, wiping or the like, after which the adhesive is permitted to dry. The coated metal surface and elastomeric substrate are then typically brought together under heat and pressure to complete the bonding procedure. The surface of the metal and the elastomeric substrate are normally brought together under a pressure of from about 20.7 to 172.4 Mega Pascals (MPa), preferably from about 20 MPa to 50 MPa. The resulting rubber-metal assembly is simultaneously heated to a temperature of from about 100° C. to about 300° C., preferably from about 150° C. to 170° C. The assembly should remain under the applied pressure and temperature for a period of from about 3 minutes to 60 minutes, depending on the cure rate and thickness of the rubber substrate. This process may be carried out by applying the rubber substrate as a semi-molten material to the metal surface as in, for example, an injection-molding process. The process may also be carried out by utilizing compression molding, transfer molding or autoclave curing techniques. The process may also involve a post-cure step as is known in the art. After the process is complete, the bond is fully vulcanized and ready for use in a final application.

Although the adhesive compositions of the present invention are preferred for bonding non-sulfur-cured elastomers to metal, the present adhesive compositions may be applied as an adhesive, primer or coating to any surface or substrate capable of receiving the adhesive. Thus it is possible to overlay the formulations of this invention with covercoats to which the formulations will knit when exposed to heat. Such covercoats may be in the nature of protective coatings or other adhesives, in which case the silane composition can be classified as a primer. As an adhesive, the covercoat may embody chemistry which enables it to knit or bond to elastomers during vulcanization that are not themselves sufficiently bonded by the formulations of this invention.

The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, Buna-S, Buna-N, butyl rubber, brominated butyl rubber, nitrile rubber, and the like. The material is most preferably a polyol- or peroxide-cured elastomer such as silicone rubber, nitrile butadiene rubber, or fluoroelastomer. The surface to which the material is bonded can be any surface such as a glass, fabric, or plastic surface capable of receiving the adhesive and is preferably a metal surface selected from any of the common structural metals such as iron, steel (including stainless steel), lead, aluminum, copper, brass, bronze, Monel metal, nickel, zinc, and the like.

It is possible to formulate the present adhesive compositions using the alkoxy silane compounds in combination with the unsaturated acid compounds over a wide range of ratios of the two ingredients. The molecular ratio need not be stoichiometric (one-to-one). Adhesives can be formulated with either ingredient in excess and still have condensation of the two in situ under vulcanization conditions. For example, with an excess of an aminofunctional alkoxy silane compound, it is possible to formulate adhesives whose chemical coupling capability includes the amino reactivity as well as the reactivity of the carbon-to-carbon double bond from the unsaturated acid compound. Such adhesives are believed to offer extended versatility in bonding to different types of specialty elastomers, i.e. elastomers cured by different mechanisms, or to different types of covercoats.

The following examples are provided for illustration only and are not intended to limit the scope of the invention which is defined by the claims.

EXAMPLE 1

A simple mixture is prepared by shaking or mixing together 86 g of deionized water, 10 g of aminopropyl triethoxysilane, and 4.0 g of glacial methacrylic acid. The resulting mixture is then diluted with 2 parts of water per 1 part of adhesive mixture.

EXAMPLE 2

To 10 g of aminopropyl triethoxysilane are added 84.5 g of deionized water, followed by addition of 4.0 g of methacrylic acid and 1.5 g of acetic acid. The resulting adhesive mixture is diluted with 1 part of water per 1 part of adhesive mixture.

EXAMPLE 3

To 84.5 g of deionized water are added 10 g of aminopropyl triethoxysilane and 5.5 g of methacrylic acid. The resulting adhesive mixture is diluted with 1 part of water per 1 part of adhesive mixture.

EXAMPLE 4

To 86 g of deionized water are added 10 g of aminopropyl triethoxysilane and 4 g of methacrylic acid. The resulting adhesive mixture is not diluted prior to application.

EXAMPLE 5

To 8.0 g of aminopropyl triethoxysilane are added 2.0 g of glacial methacrylic acid and 90.0 g of deionized water. The resulting adhesive mixture is diluted with 1 part of water per 1 part of adhesive mixture.

EXAMPLE 6

To 8.0 g of aminopropyl triethoxysilane are added 4.0 g of glacial methacrylic acid and 88.0 g of deionized water. The resulting adhesive mixture is diluted with 1 part of water per 1 part of adhesive mixture.

In preparation for bonding to the substrates described below, clean grit-blasted steel coupons are dipped in each of the formulations of Examples 1 through 4 and allowed to dry under ambient conditions for one hour or more. Zinc-phosphatized steel coupons are utilized for Examples 5 and 6. The adhesive-coated coupons are then used to prepare test assemblies according to ASTM D429-81, Method B.

The various peroxide-cured elastomers utilized in the examples are described below.

EXAMPLES 1 AND 2 (SILICONE ELASTOMER)

| Ingredient | Parts (by weight) |
| --- | --- |
| BLENSIL SE 44U (General Electric Co.) (silicone gum stock) | 38 |
| BLENSIL SE 88U (General Electric Co.) (silicone gum stock) | 62 |
| DICUP 40C (Hercules Incorporated) (dicumylperoxide) | 2.5 |

The above ingredients are combined in a conventional manner and cured for 30 minutes at 171° C. in the form of ⅛ inch rubber strips that are in intimate contact with the adhesive-coated steel coupons according to ASTM D429-81, Method B.

EXAMPLE 3 (FLUOROELASTOMER)

| Ingredient | Parts (by weight) |
| --- | --- |
| VITON GF (E. I. Du Pont De Nemours & Co.) (terpolymer) | 100 |
| N990 Carbon Black | 30 |
| Carnauba Wax | 1.5 |
| DIAK 7 (E. I. Du Pont De Nemours & Co.) (triallylisocyanurate) | 3 |
| LUPERCOL 101XL (Atochem Inc.) (organic peroxide) | 3 |
| Sublimed Litharge | 3 |

The above ingredients are combined in a conventional manner and cured for 12 minutes at 171° C. with 24 hours of post-cure at 232° C. in the form of ⅛ inch rubber strips that are in intimate contact with the adhesive-coated steel coupons according to ASTM D429-81, Method B.

EXAMPLE 4 (NITRILE BUTADIENE RUBBER)

Representative peroxide-containing NBR obtained from a manufacturer of transmission seals cured for 3-½ minutes at 188° C. in the form of ⅛ inch rubber strips that are in intimate contact with the adhesive-coated steel coupons according to ASTM D429-81, Method B.

EXAMPLES 5 AND 6 (FLUOROELASTOMER B)

| Ingredient | Parts (by weight) |
|---|---|
| VITON A401C (E. I. Du Pont De Nemours & Co.) (fluoroelastomer gum base with Bisphenol AF polyol) | 70 |
| VITON A500 (E. I. Du Pont De Nemours & Co.) (fluoroelastomer gum base) | 30 |
| MAGLITE D (Whittaker Clark & Daniels, Inc.) (magnesium oxide) | 8 |
| Calcium Hydroxide | 3 |
| N-990 Carbon Black | 30 |

The above ingredients are combined in a conventional manner and cured for 8 minutes at 171° C. with 24 hours of post-cure at 232° C. in the form of ⅛ inch rubber strips that are in intimate contact with the adhesive-coated steel coupons according to ASTM D429-81, Method B.

In the data from the bonding tests given below in Table 1, reference is made to failure in the rubber body (R). Failure is expressed in terms of percent, and a high percent of failure in the rubber is desirable since this indicates that the adhesive bond is stronger than the rubber itself. The pounds of pull indicate the pounds of force per lineal inch needed to pull the rubber body from the metal.

TABLE 1

| Example No. | Substrate | Bond Failure | Pounds Pull |
|---|---|---|---|
| 1 | Silicone elastomer | 90 R | 13 |
| 2 | Silicone elastomer | 100 R | 15 |
| 3 | Fluoroelastomer A | 98 R | 35 |
| 4 | Nitrile butadiene rubber | 40 R | 34 |
| 5 | Fluoroelastomer B | 100 R | 33 |
| 6 | Fluoroelastomer B | 100 R | 31 |

As can be seen from the above data, the adhesive compositions of the present invention, which embody no organic solvents and, which are therefore environmentally acceptable, can effectively bond a variety of polyol- and peroxide-cured elastomers.

What is claimed is:

1. An aqueous adhesive composition consisting essentially of an alkoxy silane compound, an unsaturated acid compound and water, wherein the alkoxy silane compound corresponds to the following formula:

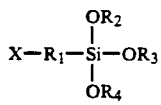

wherein $R_1$ is a divalent aliphatic hydrocarbon residue having from about 1 to 10 carbon atoms; $R_2$, $R_3$, and $R_4$ are the same or different monovalent aliphatic hydrocarbon residues of sufficient molecular weight so that the silane is stable during preparation of the adhesive composition and yet do not prejudice hydrolysis of the silane under conditions of use of the adhesive composition; and X is an amino or alkylamino group.

2. A composition of matter according to claim 1 wherein the unsaturated acid compound is selected from the group consisting of methacrylic acid, acrylic acid, maleic acid, fumaric acid, itaconic acid, crotonic acid, vinyl sulphonic acid, and unsaturated derivatives of sulfurous, sulfuric, phosphoric, and phosphonic acids.

3. A composition of matter according to claim 1 wherein the unsaturated acid compound is methacrylic acid.

4. An adhesive composition according to claim 1 wherein $R_1$, $R_2$, $R_3$, and $R_4$ are aliphatic hydrocarbon residues having from 1 to 5 carbon atoms and the alkoxy silane compound is a low molecular weight alkoxy silane compound selected from the group consisting of aminopropyl triethoxysilane, aminopropyl trimethoxysilane, and aminoethylaminopropyl triethoxysilane.

5. An adhesive composition according to claim 4 wherein the alkoxy silane compound is aminopropyl triethoxysilane.

6. An adhesive composition according to claim 4 wherein the unsaturated acid compound is a low molecular weight unsaturated acid compound selected from the group consisting of methacrylic acid, acrylic acid, maleic acid, fumaric acid, itaconic acid, crotonic acid, and vinyl sulphonic acid.

7. An adhesive composition according to claim 6 wherein the unsaturated acid compound is methacrylic acid.

8. An adhesive composition according to claim 4 wherein the alkoxy silane compound is present in an amount ranging from about 10 to 90 percent by weight of the solute portion of the composition, the unsaturated acid compound is present in an amount ranging from about 90 to 10 percent by weight of the solute portion of the composition, and the water is present in an amount sufficient to create an aqueous formulation having a total solids content ranging from about 1 to 25 percent.

9. An adhesive composition according to claim 8 wherein the the alkoxy silane compound is present in an amount ranging from about 25 to 75 percent by weight of the solute portion of the composition, the unsaturated acid compound is present in an amount ranging from about 75 to 25 percent by weight of the solute portion of the composition, and the water is present in an amount sufficient to create an aqueous formulation having a total solids content ranging from about 2 to 15 percent.

10. An adhesive composition according to claim 8 wherein the alkoxy silane compound is selected from the group consisting of aminopropyl triethoxysilane, aminopropyl trimethoxysilane, and aminoethylaminopropyl triethoxysilane.

11. An adhesive composition according to claim 10 wherein the alkoxy silane compound is aminopropyl triethoxysilane.

12. An adhesive composition according to claim 8 wherein the unsaturated acid compound is selected from the group consisting of methacrylic acid, acrylic acid, maleic acid, fumaric acid, itaconic acid, crotonic acid, and vinyl sulphonic acid.

13. An adhesive composition according to claim 12 wherein the unsaturated acid compound is methacrylic acid.

14. An aqueous adhesive composition according to claim 4 further comprising an additional acid compound selected from the group consisting of acetic acid, hydrochloric acid, formic acid, propionic acid, and nitric acid.

15. An aqueous adhesive composition according to claim 14 wherein the additional acid compound is acetic acid.

16. An aqueous adhesive composition comprising from about 25 to 75 percent by weight of solute of aminopropyl triethoxysilane, from about 75 to 25 percent by weight of solute of methacrylic acid, and water in an amount sufficient to create an aqueous formulation having a total solids content ranging from about 2 to 15 percent.

* * * * *